United States Patent
Molyneux et al.

(10) Patent No.: US 11,433,828 B2
(45) Date of Patent: Sep. 6, 2022

(54) BOOT HINGE COVER TRIM FIXING

(71) Applicant: BENTLEY MOTORS LIMITED, Crewe (GB)

(72) Inventors: David Molyneux, Shavington (GB); Steve Crowe, Sandbach (GB); Paul Wentworth, Leek (GB)

(73) Assignee: Bentley Motors Limited, Crewe (GB)

( * ) Notice: Subject to any disclaimer, the term of this patent is extended or adjusted under 35 U.S.C. 154(b) by 181 days.

(21) Appl. No.: 16/963,195

(22) PCT Filed: Jan. 19, 2019

(86) PCT No.: PCT/GB2019/050010
§ 371 (c)(1),
(2) Date: Jul. 17, 2020

(87) PCT Pub. No.: WO2019/141964
PCT Pub. Date: Jul. 25, 2019

(65) Prior Publication Data
US 2021/0122300 A1    Apr. 29, 2021

(30) Foreign Application Priority Data
Jan. 19, 2018 (GB) .................................. 1800907

(51) Int. Cl.
*B60R 13/00* (2006.01)
(52) U.S. Cl.
CPC .................................... *B60R 13/00* (2013.01)
(58) Field of Classification Search
CPC ........................... E05D 11/0054; B60R 13/00
See application file for complete search history.

(56) References Cited

U.S. PATENT DOCUMENTS

| 5,739,470 A | 4/1998 | Takeda |
| 6,572,177 B2 | 6/2003 | Griffis |
| (Continued) | | |

FOREIGN PATENT DOCUMENTS

| EP | 1363375 A1 | 11/2003 |
| EP | 2085550 A1 | 1/2009 |
| (Continued) | | |

OTHER PUBLICATIONS

UK Patent Application No. GB1800907.6; Combined Search and Examination Report; dated Jul. 20, 2018.
(Continued)

*Primary Examiner* — Lori L Lyjak
(74) *Attorney, Agent, or Firm* — Schwabe Williamson & Wyatt, P.C.

(57) ABSTRACT

A hinge cover member (20) for use with a swan neck type hinge (12) has an elongate channel shaped portion (24) for receiving the hinge arm (14) and a housing portion (13) for location about a mounting structure (18) which attaches the hinge arm to the closure. The housing portion defines at least one formation (70) for attaching an edge (72) of a trim panel (56) mounted to the closure to the housing portion. The formation (70) may be a clip which clamps the edge (72) of the trim panel. The trim panel (56 may have a live hinge (74) adjacent the edge about which the panel can flex. During adjustment of the closure (13) relative to the hinge, the edge region (72) of the trim panel is constrained to move with the hinge cover.

18 Claims, 8 Drawing Sheets

(56) References Cited

U.S. PATENT DOCUMENTS

| | | | |
|---|---|---|---|
| 6,861,589 B2 | 3/2005 | Katsumata | |
| 7,987,554 B2 * | 8/2011 | Hakamata | E05D 11/0054 296/76 |
| 8,251,431 B2 * | 8/2012 | Nakazato | E05D 5/062 296/76 |
| 9,435,151 B2 | 9/2016 | Tanabe | |
| 9,701,259 B2 | 7/2017 | Tanabe | |
| 9,896,041 B2 | 2/2018 | Liebau | |
| 10,221,596 B1 | 3/2019 | Cruz | |
| 2003/0038500 A1 | 2/2003 | Aubry | |
| 2003/0213607 A1 | 11/2003 | Katsumata | |
| 2009/0193618 A1 | 8/2009 | Hakamata | |
| 2015/0183382 A1 | 7/2015 | Tanabe | |
| 2016/0264069 A1 | 9/2016 | Liebau | |
| 2021/0122300 A1 | 4/2021 | Molyneux | |

FOREIGN PATENT DOCUMENTS

| | | |
|---|---|---|
| JP | H11136830 A | 5/1999 |
| JP | 3260114 B2 | 2/2002 |
| JP | 2015123928 A | 7/2015 |
| JP | 2016022782 A | 2/2016 |
| KR | 100850982 B1 | 8/2008 |
| KR | 1020170069718 A | 6/2017 |

OTHER PUBLICATIONS

UK Patent Application No. GB1800908.4; Combined Search and Examination Report; dated Jul. 20, 2018.

International Patent Application No. PCT/GB2019/05001 0; International Search Report; dated Mar. 21, 2019.

International Patent Application No. PCT/GB2019/050014; International Search Report; dated Mar. 21, 2019.

U.S. Appl. No. 16/963,192; Notice of Allowance; dated Jan. 14, 2022.

\* cited by examiner

BOOT HINGE COVER TRIM FIXING

CROSS-REFERENCE TO RELATED APPLICATION

This application is a 371 U.S. National Stage of International Application No. PCT/GB2019/050010, filed Jan. 3, 2019, entitled "A HINGE COVER AND VEHICLE," which designated, among the various States, the United States of America, and which claims priority to GB 1800907.6, filed Jan. 19, 2018, both of which are hereby incorporated by reference.

TECHNICAL FIELD OF THE INVENTION

The present invention relates to hinge covers, more particularly but not exclusively, the present invention relates to hinge covers for hinges with an elongate hinge arm used to attach a closure to a vehicle body. The invention also relates to a vehicle having such a cover mounted to a hinge arm

BACKGROUND TO THE INVENTION

Hinges are used on vehicles to attach moveable closures, such as doors, bonnets, tailgates, and boot lids, etc., to the vehicle body. Hinges having elongate hinge arms are often used mount a boot lid to the body for example. Such hinges are often referred to as swan neck hinges due to the shape of the hinge arm and are used because they assist in supporting the weight of the boot lid upon opening or closing and help in guiding the boot lid through both the opening and closing movements.

Due to the structural requirements, it is not viable to position swan neck hinges in a location that conceals them from view when the respective closure is open. Electrical cables or harnesses which must pass from the body into the closure are often routed along the hinge arm and so will also be exposed when the closure is open.

In order to improve the aesthetics of a vehicle, it is known to attach covers to conceal components that may be deemed unsightly, or deemed to create an unfinished appearance. It is known in particular to attach covers to the elongate arms of swan neck type hinges in order to conceal the hinge arm and any attached cable or harness. The known hinge covers usually comprise visible fixings such as buckles, belts, clips or straps in order to securely retain the hinge covers in place. Such visible fixings can be aesthetically unsatisfactory.

The known covers for swan neck type hinges generally comprise an elongate three sided channel section which goes over the arm to cover it on the three most exposed sides. Whilst this covers the majority of the hinge arm, the arm, and any attached cable or harness, remains visible along the exposed fourth side reducing the aesthetic quality. It is also known to provide a housing portion at the closure end of the channel shaped portion which encapsulates the hinge mounting on the closure. Where a trim panel is attached to the interior surface of the closure, the trim panel and the housing portion are aligned to provide a neat finish. However, subsequent adjustment of the closure causes it to move relative to the hinge arm on which the cover is mounted and can result in the housing portion moving out of alignment with the trim panel, leading to excessive gapping between them.

It would be advantageous to provide a hinge cover assembly that at least partially mitigates one or more drawbacks associated with the known hinge covers.

In particular, it would be beneficial to provide a hinge cover for a hinge having an elongate hinge arm, wherein any fixings used to secure the cover to the hinge arm are not visible when the cover is mounted.

It would also be advantageous to provide a hinge cover for a hinge having an elongate arm suitable for concealing a larger proportion of a hinge arm than current covers achieve.

It would also be beneficial to provide a hinge cover for a hinge having an elongate arm which is able to form a flexible connection with a trim panel on an associated closure in order to prevent gapping upon relative movement between the closure and the hinge arm.

SUMMARY OF THE INVENTION

According to a first aspect of the invention, there is provided a hinge cover member for use with a swan neck type hinge for attaching a closure to a vehicle body, the hinge having a mounting structure at one end of the hinge arm for attaching the hinge arm to the closure, the hinge cover member comprising an elongate channel shaped portion for receiving the hinge arm and a housing portion at one end of the channel portion configured to overlie part of a surface of the closure about the mounting structure and wherein the housing portion defines at least one formation for attaching an edge of a trim panel mounted to the closure to the housing portion.

The at least one formation may be a clip formation for gripping said edge of the trim panel. The at least one clip formation may define a slot or recess along at least part of an edge of the housing portion into which an edge region of the trim panel is inserted in use. The height of the slot or recess may be adjusted relative to the corresponding trim panel edge that is to be received. The slot or recess may further be adjusted depending on the clamping force that is to be applied to the trim panel edge.

The housing portion may be integrally formed with the channel shaped portion, or may be a separate component adapted to form a connection with the channel shaped portion. The housing portion may entirely conceal, or conceal a significant proportion of, the mounting structure in use.

In an embodiment, the channel shaped portion defines a pair of spaced side walls interconnected at one end by a base region, the channel portion being resiliently deformable such that the side walls can be biased apart from a rest position, a plurality of locking projections being provided on the inner surface of the channel shaped portion for engagement with corresponding locking formations on the hinge arm to secure the cover member to the hinge arm. Said plurality of locking projections may be provided on the inner surface of at least one of the side walls. The side walls of the channel shaped portion may be configured to be biased apart from the rest position to allow the first cover member to be mounted to the hinge arm in use.

In an embodiment, a plurality of locating ribs are spaced apart along the inner surface of the channel shaped portion for engagement with an outer surface of the hinge arm. In an embodiment the plurality of locating ribs comprise locating ribs on an inner surface of one of the side walls for engagement with a first side of the hinge arm, a plurality of clamping formations projecting from the inner surface of the base region in spaced relation said one of the side walls, the clamping formations configured to engage a second side of the hinge arm opposite the first side such that in use, the hinge arm is clamped between the clamping formations and the locating ribs on said one side wall of the channel portion.

The hinge cover member may be a first hinge cover member forming part of a hinge cover assembly together with a second hinge cover member, the first and second cover members being mountable about the hinge arm and configured so as to completely encircle the hinge arm over at least part of its length in use.

In accordance with a second aspect of the invention, there is provided a vehicle having a body and a closure mounted to the body by a swan neck type hinge, the hinge having an elongate hinge arm attached to the closure at one end by a mounting structure, wherein a hinge cover member in accordance with the first aspect of the invention is mounted to the hinge arm.

A trim panel may be mounted to the closure and an edge of the trim panel attached to the housing portion by said formation. Where said formation is a clip formation, an edge of the trim panel may be clamped in the clip formation. The trim panel may have a live hinge proximal said edge about which the trim panel is able to flex. This may accommodate at least a limited degree of relative movement between the housing portion and the closure without the edge region of the trim panel disconnecting from said clip formation. The arrangement may be configured such that during adjustment of the position of the closure relative to the hinge, the edge region of the trim panel is constrained to move with the hinge cover. The housing portion may have a first section extending generally in a first plane for overlaying an inner face of the closure to which the second mounting structure is attached and a second section extending generally in a second plane perpendicular to the first plane, the clip formation being provided along an edge of the second section.

Where the hinge cover member has a plurality of locking projections on the inner surface of the channel shaped portion, the hinge arm may define corresponding locking formations in the form of locking apertures in which the locking projections engage to secure the first cover portion to the hinge arm. The locking apertures may be defined a side region of the hinge arm.

Where the hinge cover comprises locating ribs on an inner surface of one of the side walls for engagement with a first side of the hinge arm and a plurality of clamping formations projecting from the inner surface of the base region in spaced relation said one of the side walls, the hinge arm may be clamped between the locating ribs on said one of the side walls of the channel portion of the first cover member and the clamping formations.

The spacing between the side walls of the channel portion of the first cover member may be greater than the width of the hinge arm.

The closure may be a boot lid.

DETAILED DESCRIPTION OF THE INVENTION

In order that the invention may be more clearly understood one or more embodiments thereof will now be described, by way of example only, with reference to the accompanying drawings, of which:

Figure 3:
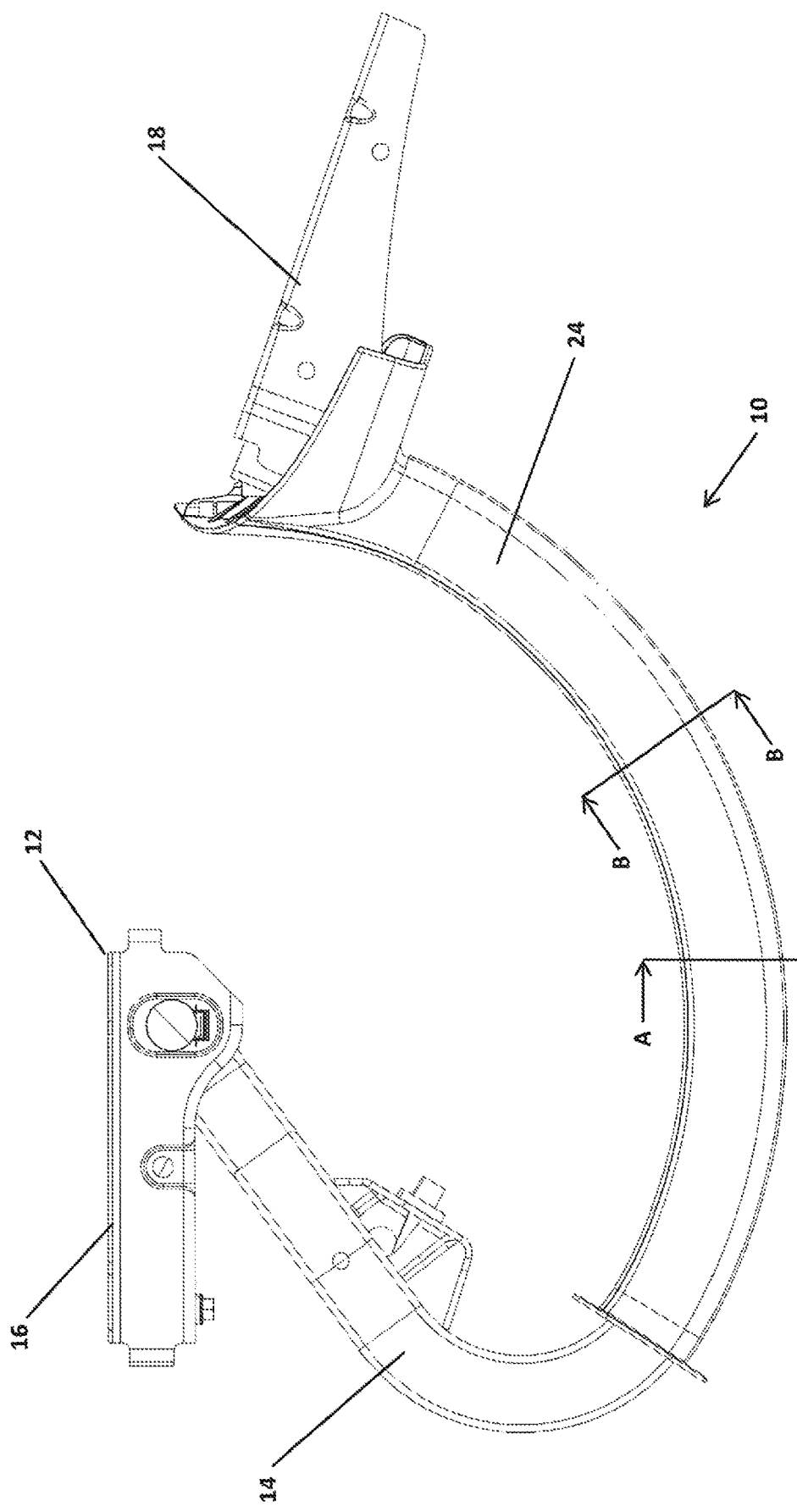
FIG. 3 shows a side view of a swan neck type hinge with the hinge cover assembly of FIGS. 1 and 2 mounted to an arm of the hinge.
Figure 4:
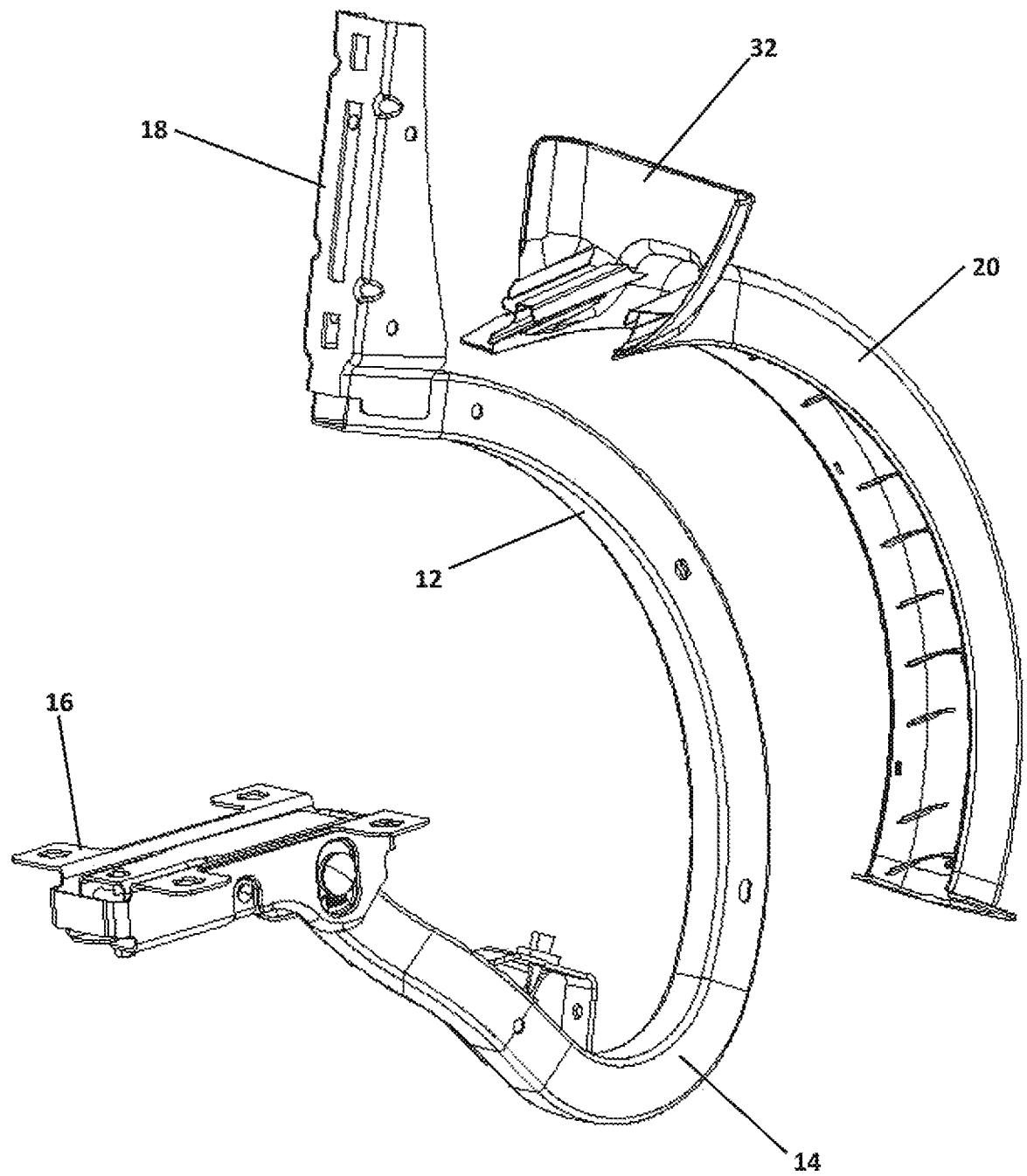
FIG. 4 shows an exploded view of part of the hinge cover assembly and swan neck type hinge of FIG. 3 in a pre-assembled configuration.
Figure 5:
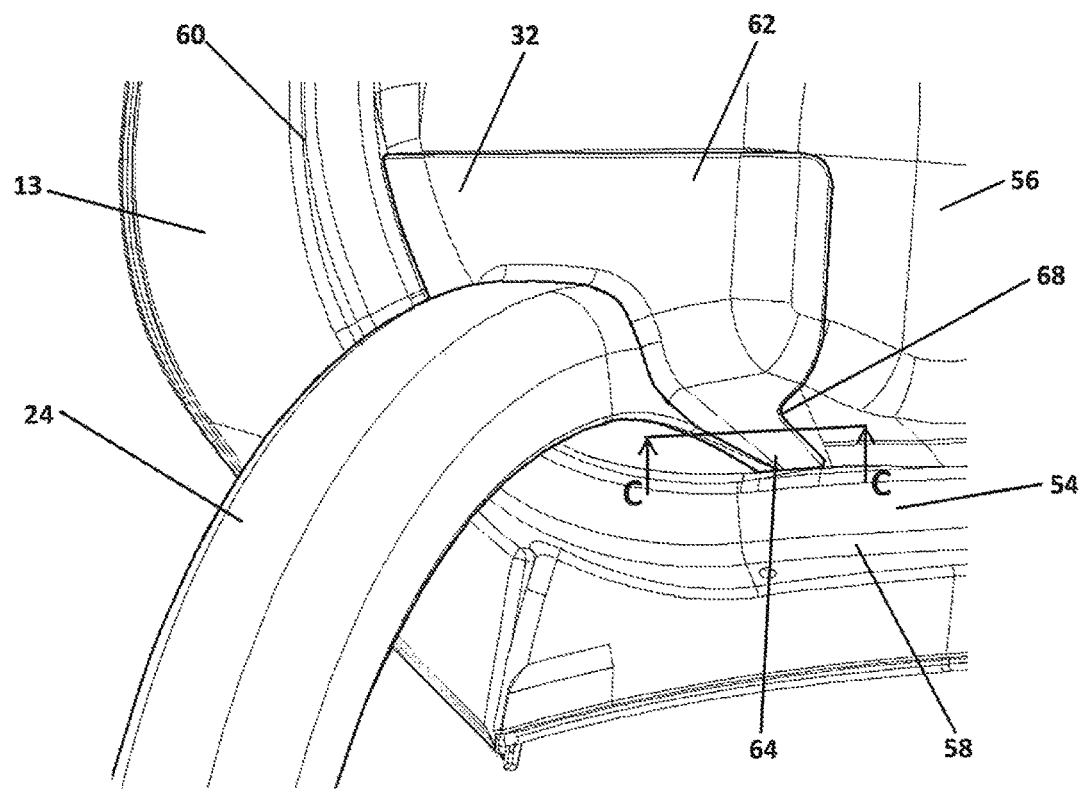
FIG. 5 shows a perspective view of part of a boot lid showing the hinge cover assembly of FIGS. 1 and 2 mounted to an arm of a swan neck hinge attached to the boot lid.

With reference initially to FIGS. 1 to 4, a first embodiment of a hinge cover assembly 10, in accordance with aspects of the invention will be described. The hinge cover assembly 10 is adapted for use with a swan neck hinge 12 as illustrated in FIGS. 3 and 4. Hinges of this type are commonly used for mounting a movable closure to a vehicle body. In the embodiment described, the hinge is used to mount a boot lid 13 to the body of a vehicle. However, it should be appreciated that the invention is not limited to use with hinges for mounting boot lids but can be adapted for use with hinges for mounting other types of closure to a vehicle or indeed non-vehicular applications.

The hinge 12 has an elongate hinge arm 14 and includes a first mounting structure 16 at one end for attaching the hinge arm 14 to the body of a vehicle (not shown) and a second mounting structure 18 at the other end for attaching the hinge arm 14 to the boot lid 13. The hinge arm is pivotally connected to each of the mounting structures 16, 18 in a known manner and may be adjustably connected to at least the first mounting structure 16.

The hinge cover assembly 10 includes a first cover member 20 and a second cover member 22.

The first cover member 20 has an elongate channel shaped portion 24 having a pair of opposed side walls 26, 28 interconnected at one end by a base region or wall 30. The channel shaped portion 24 is mounted over the elongate arm 14 of the swan neck hinge 12 to encapsulate the arm about three sides over part of its length. The hinge arm 14 is curved in the longitudinal direction and the elongate channel shaped portion 24 is correspondingly curved to form a close fit over the hinge arm 12. At one end of the channel shaped portion 24 is a housing portion or flange 32. In use, the housing portion 32 overlies part of the boot lid 13 so as to encase at least part of the second mounting structure 28.

The second cover member 22 is releasably attachable to the channel shaped portion 24 of the first cover member so as to extend between the free ends of the side walls 26, 28 in opposed relation to the base region 30. The second cover member 22 is an elongate U shaped member having a base 22A and a pair of depending flanges 22B. The base 22A is substantially planar in the lateral direction but curves in the longitudinal direction to conform to the curvature of the channel shaped portion 24. The flanges 22B are a close fit between side walls 26, 28 of the first cover member 20. At least the channel shaped portion 24 of the first cover member 20 is resiliently flexible so that the side walls 26, 28 can be moved apart from a rest position to enable fitment over the hinge arm 14 and for mounting of the second cover member 22. The arrangement is such that the second cover member 22 is a tight fit between the side walls 26, 28 of the first cover member when they are in the rest position. Male engagement members or lugs 34 are spaced apart along the inner surface of each side wall 26, 28 of first cover member proximal their free ends and corresponding female engagement members or apertures 36 are provided in each of the flanges 22B of the second cover member. The male engagement members 34 are received in the apertures 36 to lock the second cover member 22 to the first cover member 20 when assembled.

Figure 3A:
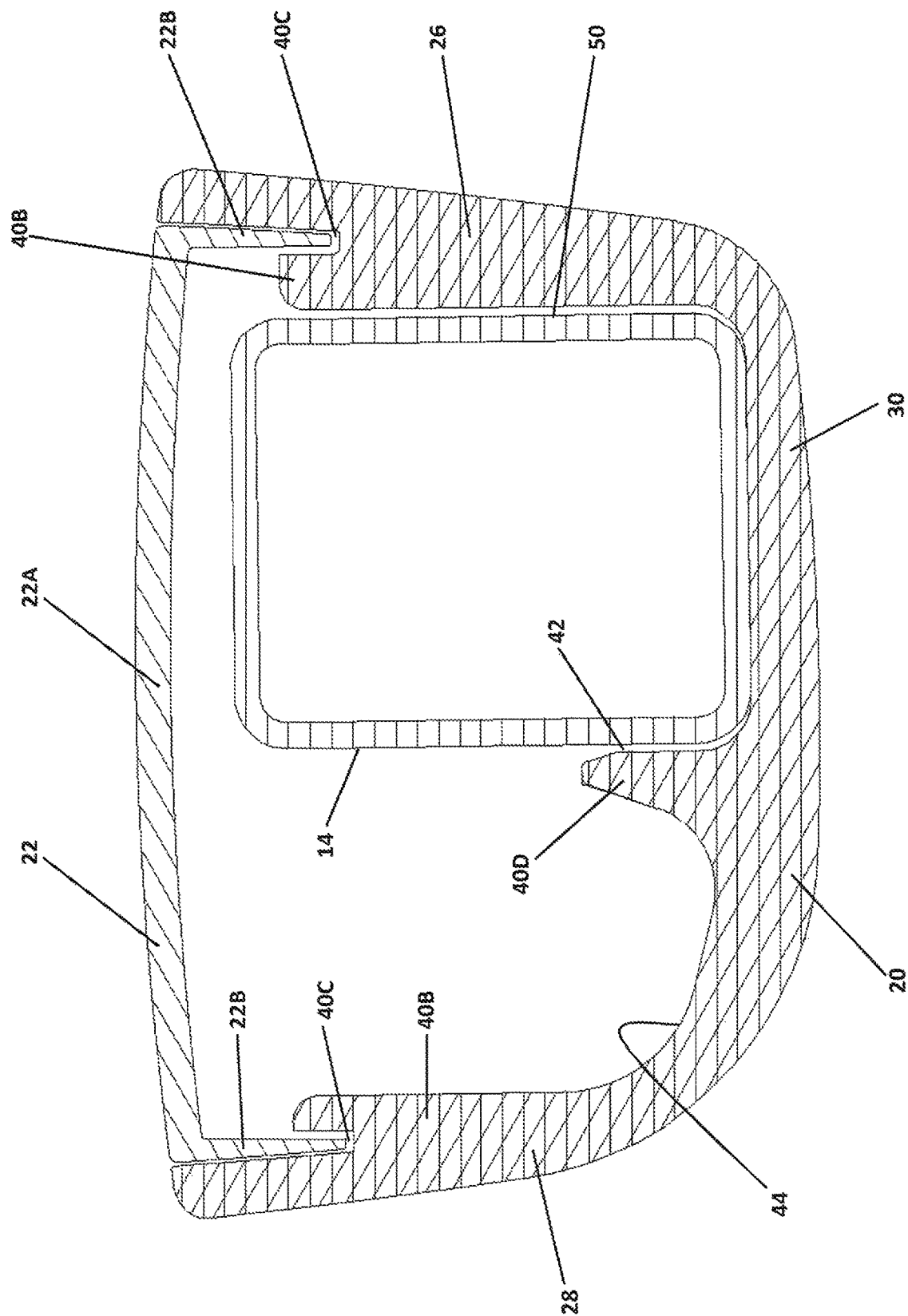
FIG. 3A is a cross-sectional view through the hinge arm and hinge cover assembly of FIG. 3 taken at the line A-A.
Figure 3B:
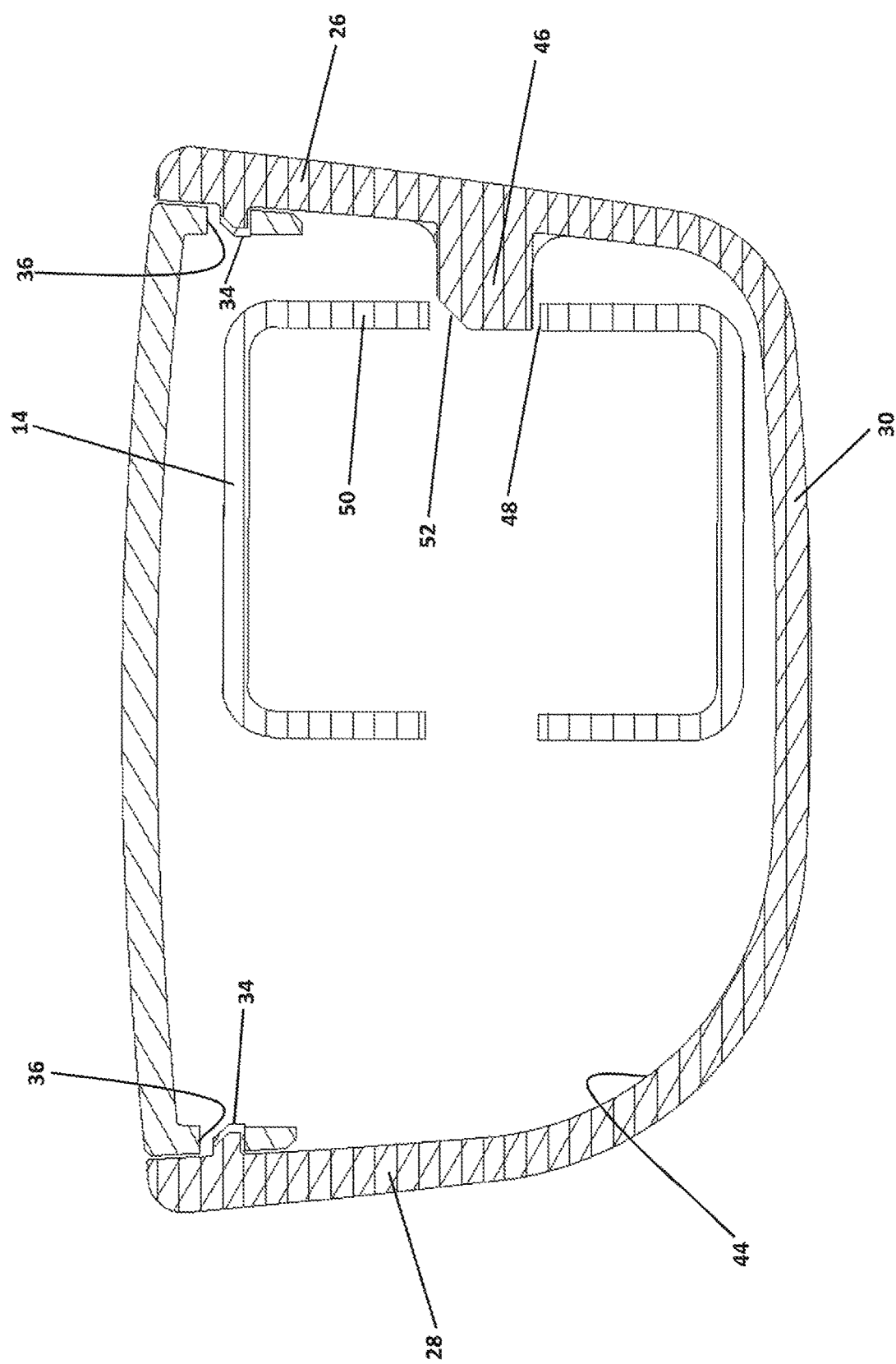
FIG. 3B is a cross-sectional view through the hinge arm and hinge cover assembly of FIG. 3 taken at the line B-B.

In use, the channel shaped portion 24 of first cover member 20 is mounted to the hinge arm 14 as illustrated in FIGS. 3, 3A and 3B so that it extends about the hinge arm on the three most exposed sides of the arm. The second cover member 22 is then mounted to the first cover member 22, as can be seen best in FIGS. 2 and 3A, to cover the remaining side of the hinge arm 14 so that the arm is fully enclosed or encircled over at least part of its length. In use, the hinge cover assembly 10 encircles the hinge arm 14 of that part of its length which is generally exposed to view when the boot lid is open.

Figure 1:
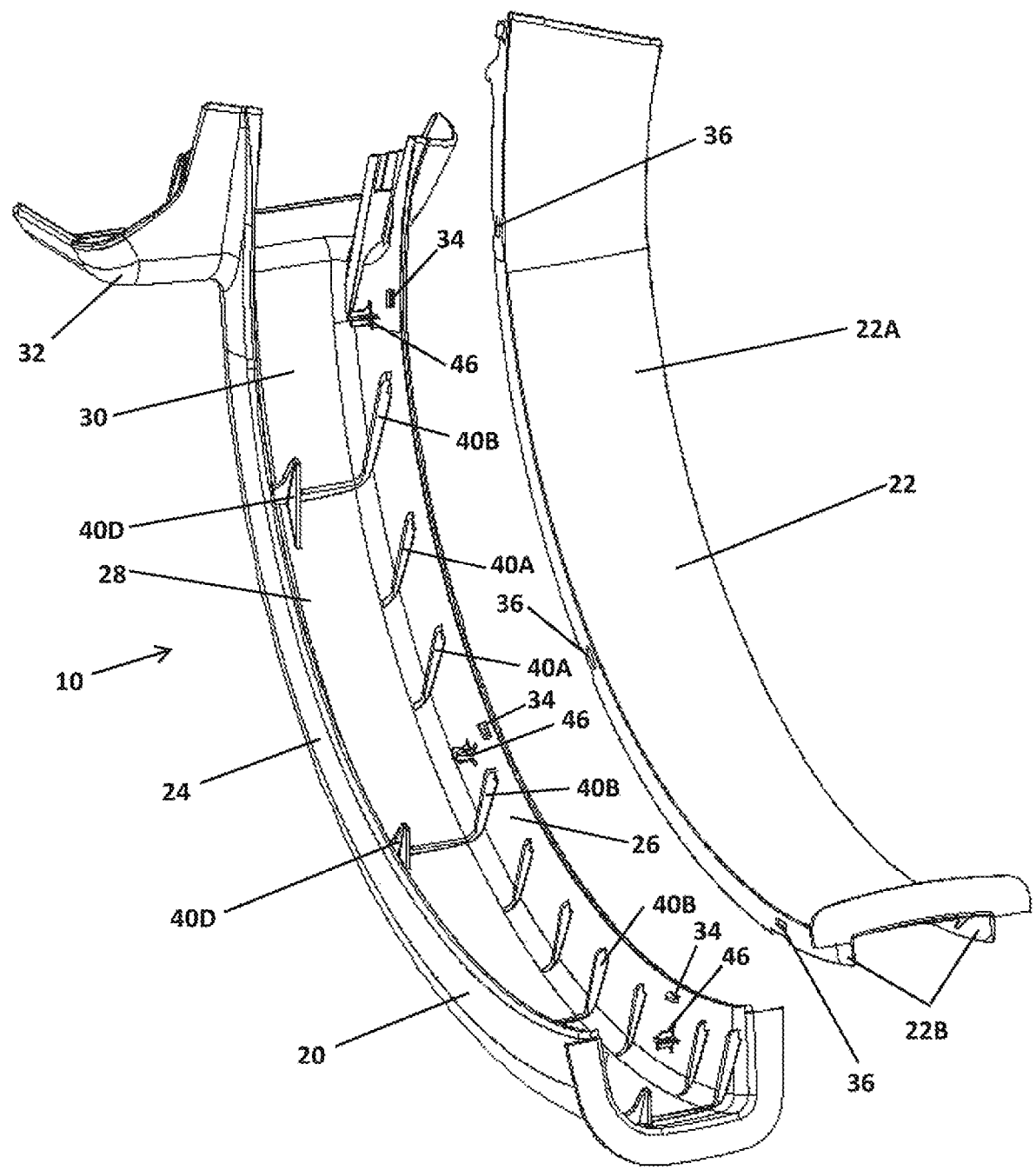
FIG. 1 shows an exploded view of an embodiment of a hinge cover assembly in accordance with aspects of the invention.
Figure 2:
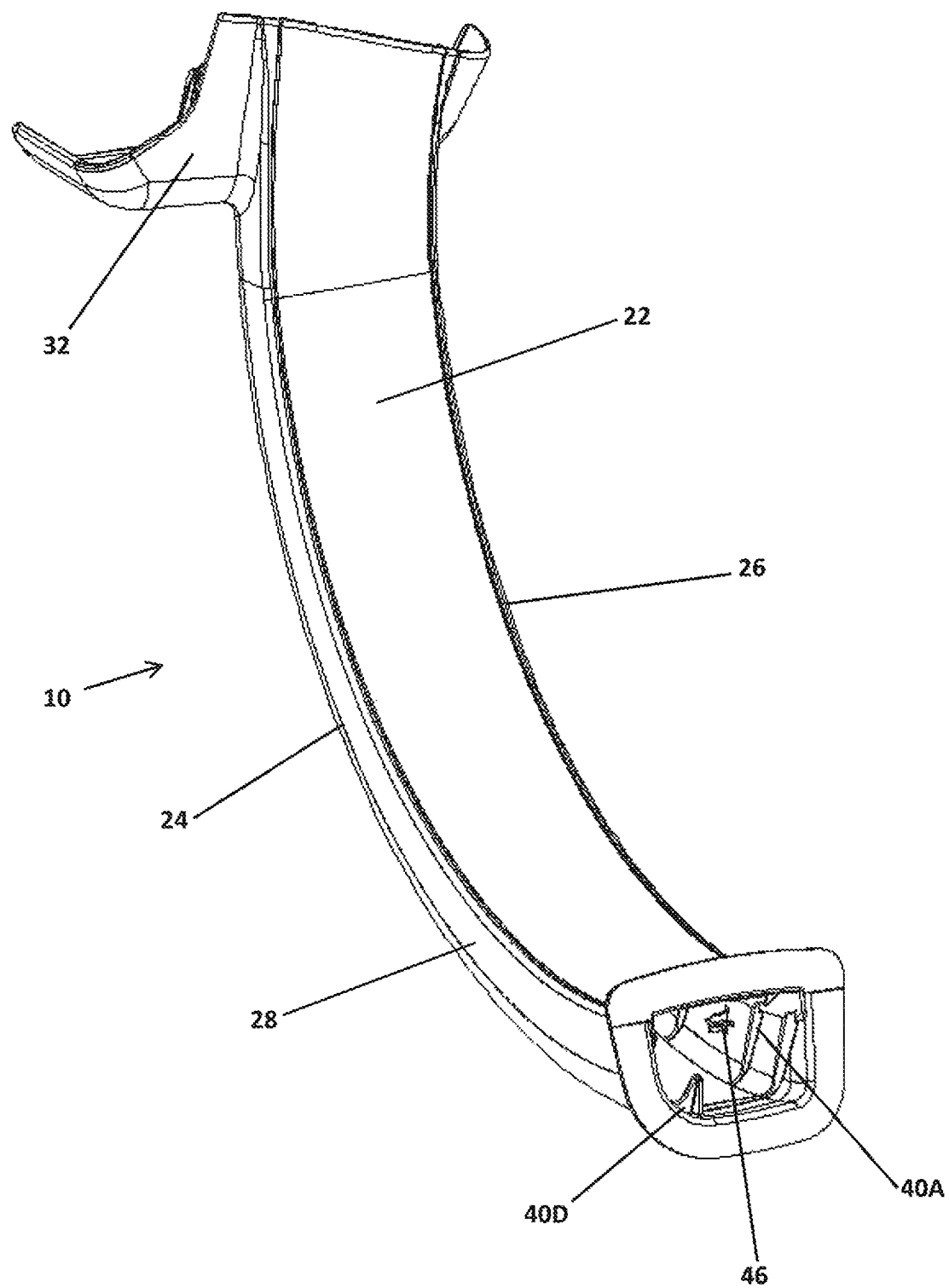
FIG. 2 shows a perspective view of the hinge cover assembly of FIG. 1 in an assembled configuration.

An embodiment for mounting of the first cover member 20 to the hinge arm 14 is best seen in FIGS. 1, 3A and 3B. The spacing between the side walls 26, 28 of the channel shaped portion 24 is larger than the width of the hinge arm 14. A number of locating ribs 40A, 40B project inwardly from the inner surface of a first one of the side walls 26. The ribs 40A, 40B extend from the base outwardly towards the free end of the first side wall 26 over part of its height and are spaced apart along the length of the channel shaped portion 24. The locating ribs 40A, 40B are arranged to contact the hinge arm 14 on one side. Some of the ribs 40A only extend up the first side wall whilst others 40B also extend laterally across the inner surface of the base region 30 and up part of the second side wall 28. The ribs 40A, 40B each define a slot 40C at their upper end or ends into which the corresponding flange 22B of the second cover member 22 is received. Also associated with each of the laterally extending ribs 40B is a clamping formation 40D which projects inwardly from the base region 30 in spaced relation to the first side wall 26. The clamping formations 40D define an abutment surface 42 which opposes the first side wall 26 and which in use contacts the hinge arm 14 on the opposite side from the ribs 40A, 40B so that the hinge arm is clamped between the ribs 40A, 40B on the first side wall 26 and the clamping formations 40D. This locates the first cover member 20 relative to the hinge arm 14. A longitudinal channel 44 is defined between the hinge arm 14 and the second side wall 28 through which cables or harnesses or other components can be routed.

To affix the first cover member 20 to the hinge arm, a number of locking projections 46 extend inwardly (laterally) from the inner surface of the first side wall 26. The locking projections 46 in this embodiment are in the form of pegs or pins which extend inwardly by a greater distance then the locating ribs 40A, 40B. The pegs or pins 46 may be cylindrical or cross shaped in lateral cross-section. Each locking projection 46 is received in a corresponding locking aperture 48 defined in a side wall 50 of the hinge arm proximal the first side wall 26. To fit the first cover member 20 to the hinge arm 14, the first side wall 26 is flexed outwardly away from the second side wall 28 and the clamping formations 40D to enable the hinge arm to be located between the first side wall 26 and the clamping formations 40D and to enable the locking projections 46 to slide up the side 50 of the hinge arm 14 to engage in their respective locking apertures 48. The locking projections 46 have a chamfered upper edge 52 which engages the hinge arm to force the first side wall 26 outwardly when the first cover member is pressed on to the hinge arm. Once the locking projections 46 have engaged in their respective locking apertures 48, the natural resilience of the material biases the first side wall 26 back to its rest position in which the hinge arm 14 is clamped between the locating ribs 40A, 40B on the first side wall 26 and the clamping formations 40D and the locking projections 46 are firmly located in the locking apertures 48. The first hinge cover member 20 is arranged so that once fitted, it is a tight fit on the hinge arm 14. Any cables, harnesses or other components that are to be routed along the longitudinal channel 44 can be arranged in position and fixed using ties as required. The second cover member 22 is then pressed into position between the free ends of the first and second side walls 26, 28 of the first cover member. The first and second side walls 26, 28 may flex apart slightly to enable the second cover member 22 to be pressed into place. Once the second cover member 22 is in position, the hinge arm 14 is completely encircled by the hinge cover assembly on all sides so that no part of the hinge arm or any associated cables, harness or other components routed along the hinge are visible over at least part of the length of the hinge arm. This provides for a particularly neat appearance. Furthermore, since all the fittings for securing the first cover member 20 to hinge arm are located internally of the channel shaped portion 24, there no externally visible fixings which further provides for a neat and aesthetically pleasing finish.

The first and second cover members 20, 22 can be made of any suitable material but are conveniently moulded from a polymeric material selected to provide the desired mechanical properties and aesthetic appearance.

Other arrangements for attaching the second cover member 22 to the first cover member 20 can be adopted. For example, the first and second cover members may have corresponding male and female connectors which can be engaged, say with a snap fit, to fix the second cover member 22 to the first cover member 20. It is preferable though that any such connectors should not be visible from the outside once the cover members are assembled together.

Whilst the use of two cover members 20, 22 to fully encircle the hinge arm is considered to be particularly desirable, a hinge cover comprising only a first cover member 20 may still be advantageous as it will enclose the hinge arm on the three most exposed sides but without any fixings that are visible once the cover member is mounted to the hinge arm. The first hinge cover member 20 if used on its own may be modified to omit the mounting slots 40C and may be modified so that the second side wall 28 is located closer to hinge arm 14. The second side wall 28 could be adapted to contact the hinge arm 14 on the opposite side from the first side wall or be provided with locating ribs similar to the ribs 40A, 40B on the first side wall omitting the clamping formations 40D.

FIGS. 5 to 8 illustrate another aspect of the invention. The housing portion or flange 32 at the closure end of the elongate channel shaped portion 24 of the first cover member is arranged to overlie part of the inner face 54 of the boot lid 13 to which the hinge arm 14 is attached by the second hinge mounting structure 18. The housing portion 32 thus covers the second hinge mounting structure 18 where it locates on the boot lid so that the mounting structure is not visible. The housing portion is profiled to interface with a trim panel 56 mounted to the inner surface of the boot lid 13 and to conform to the shape of the boot lid to provide a neat finish. The trim panel 56 may comprise a section of carpet or other fabric, for example.

Typically, the second mounting structure 18 is attached close to a lower edge 58 of the boot lid and close to one side edge 60. In order to conform to the shape of the boot lid, the housing portion 32 has a first section 62 which extends generally in a first plane overlying an inner face 54 of the boot lid 13 where the second mounting structure 18 is attached and a second section 64 which overlies part of the lower edge 58 of the boot lid and which extends generally in a second plane perpendicular to the first plane.

Figure 6:
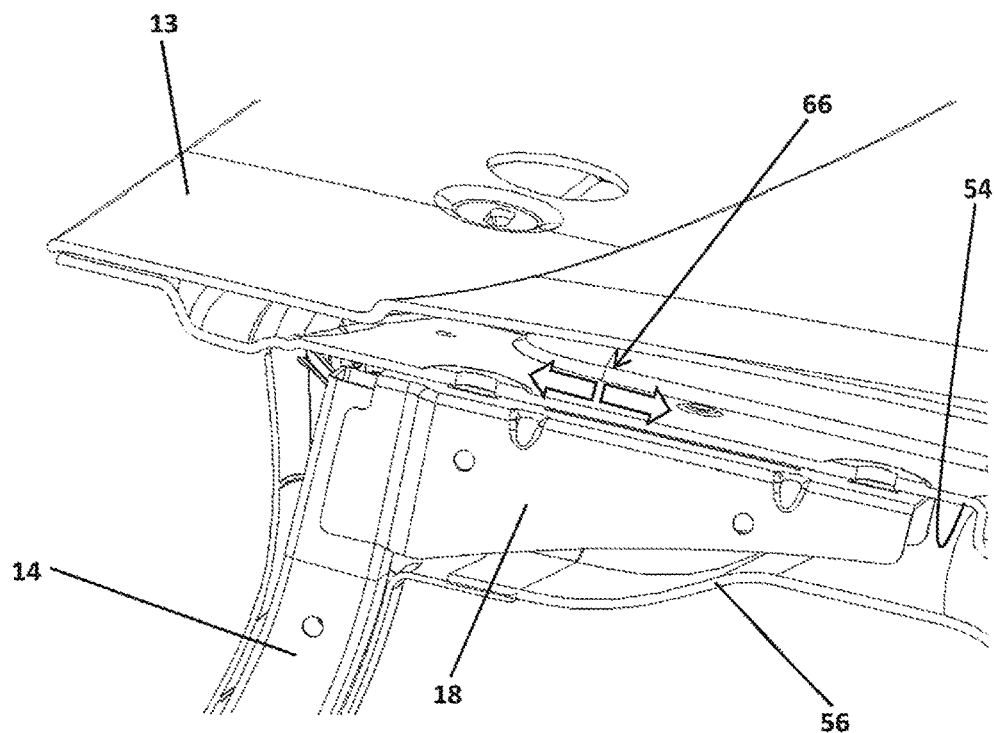
FIG. 6 is a cross sectional view through part of the boot lid of FIG. 5 showing a second mounting structure of the hinge of FIG. 3 adjustably attached to the boot lid.
Figure 7:
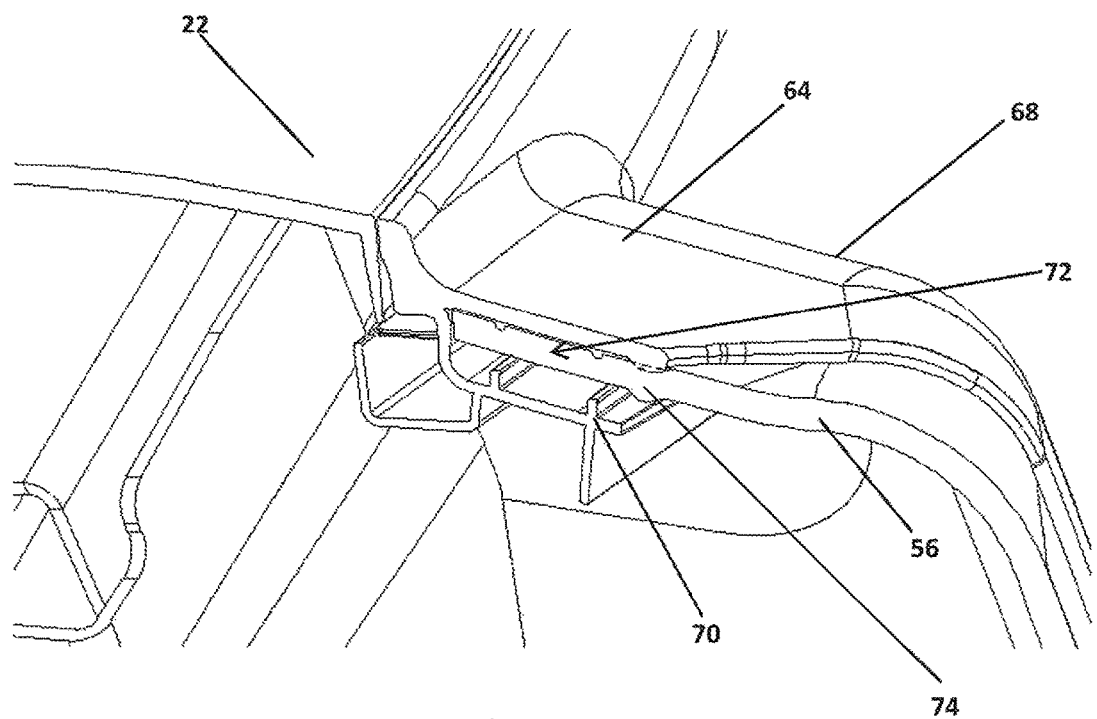
FIG. 7 is a cross-sectional view through the hinge cover assembly and trim panel of FIG. 5 taken at the line C-C.
Figure 8:
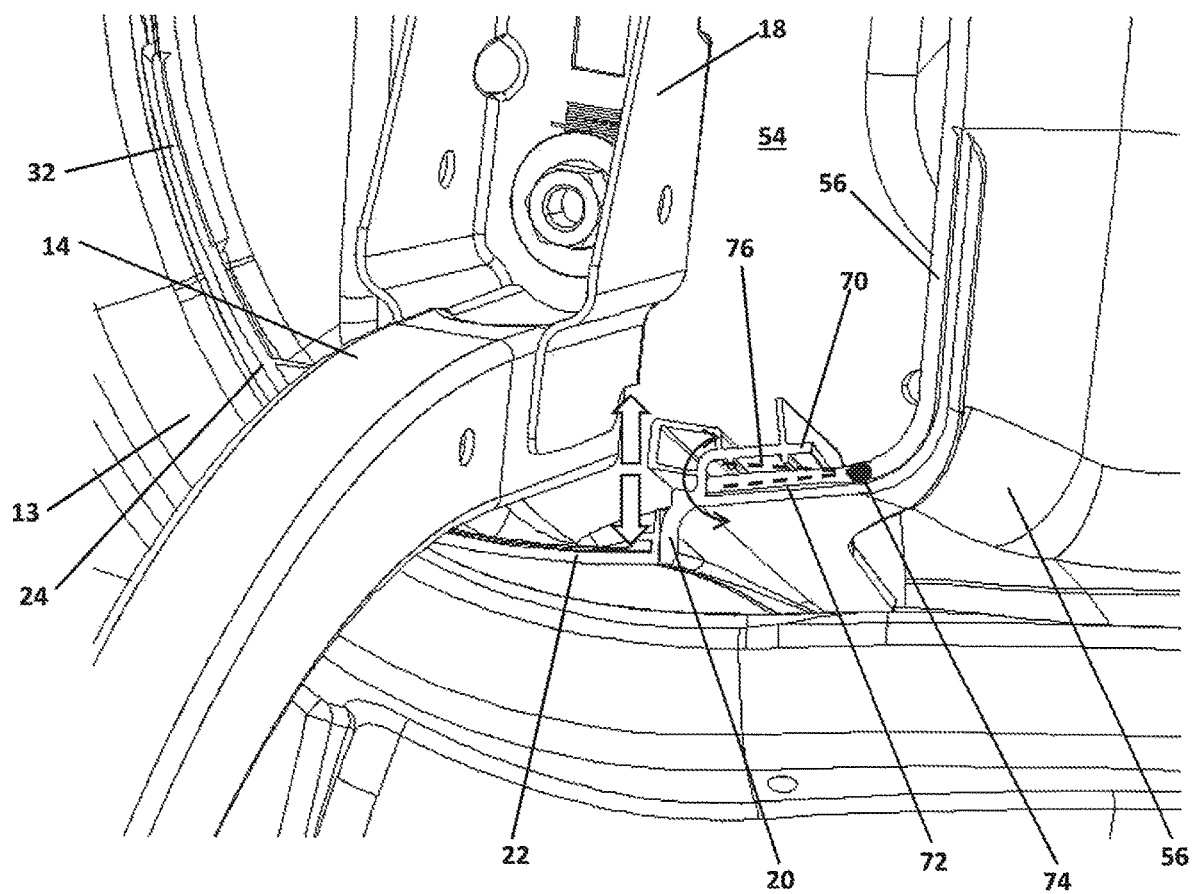
FIG. 8 is a further cross sectional view through the hinge cover assembly and trim panel of FIG. 5 taken along the line of C-C but viewed from the opposite side from that taken in FIG. 7 and also showing details of the boot lid.

As illustrated in FIG. 6, the position of the second mounting structure 18 relative to the boot lid 13 is adjustable, typically in a direction perpendicular to the first plane as indicated by arrows 66. Since the hinge cover assembly 10 is mounted to the hinge arm 14 and the trim panel 56 is mounted to the boot lid, adjusting the position of the second mounting structure 18 will result in relative movement between the housing portion 32 and the trim panel 56 which can affect the neatness of the finish. A particular issue is that relative movement between the second mounting structure 18 and the boot lid in a direction parallel to the first plane will result in the second section 64 of the housing portion 32 moving towards or away from the lower edge 58 of the boot lid which can result in a gap appearing between the housing portion 32 and the trim panel 56. To address this issue, at least along part of a side edge 68 of the second section 64 of the housing portion, the housing portion 32 defines a clip formation 70 which grips an edge region 72 of the trim panel 56 and the trim panel has a live hinge 74 which extends generally parallel to the respective side edge 68 of the second section. With this arrangement, the edge region 72 of the trim panel is constrained to move with the housing portion 32 if the position of the second mounting structure 18 on the boot lid 13 is adjusted, as is illustrated by the dashed lines at 76 in FIG. 8. This prevents gaps appearing between the housing portion 32 and the trim panel 56.

In the present embodiment, the clip formation 70 comprises a C-section slot or recess in which the edge region 72 of the trim panel is inserted, the C-section being configured to clamp the edge region 72. However, other clip formations could be used an indeed other arrangements for securing the edge region 72 of the trim panel to the housing portion can be adopted. This aspect of the invention can be used where the hinge cover comprises a first cover member 20 only or where the hinge cover is an assembly comprising first and second cover members 20, 22 as described above.

The above embodiments are described by way of example only. Many variations are possible without departing from the scope of the invention.

The invention claimed is:

1. A hinge cover member for use with a swan neck type hinge for attaching a closure to a vehicle body, the hinge having a mounting structure at one end of a hinge arm for attaching the hinge arm to the closure, the hinge cover member comprising an elongate channel shaped portion for receiving the hinge arm and a housing portion at one end of the elongate channel shaped portion configured to overlie part of a surface of the closure about the mounting structure and wherein the housing portion defines at least one formation for attaching an edge of a trim panel mounted to the closure to the housing portion.

2. The hinge cover member as claimed in claim 1, wherein the at least one formation is a clip formation for gripping said edge of the trim panel.

3. The hinge cover member as claimed in claim 1, wherein the at least one clip formation defines a slot along at least part of an edge of the housing portion into which an edge region of the trim panel is inserted in use.

4. The hinge cover member as claimed in claim 1, wherein the channel shaped portion comprises a pair of spaced side walls interconnected at one end by a base region, the elongate channel shaped portion being resiliently deformable such that the side walls can be biased apart from a rest position, a plurality of locking projections being provided on the inner surface of the elongate channel shaped portion for engagement with corresponding locking formations on the hinge arm to secure the cover member to the hinge arm.

5. The hinge cover member as claimed in claim 4, wherein said plurality of locking projections are provided on the inner surface of at least one of the side walls.

6. The hinge cover member as claimed in claim 5, wherein the side walls of the elongate channel shaped portion can be biased apart from the rest position to allow the first hinge cover member to be mounted to the hinge arm in use.

7. The hinge cover member as claimed in claim 4, wherein a plurality of locating ribs are spaced apart along the inner surface of the elongate channel shaped portion for engagement with an outer surface of the hinge arm.

8. The hinge cover member as claimed in claim 7, wherein the plurality of locating ribs comprise locating ribs on an inner surface of one of the side walls for engagement with a first side of the hinge arm, a plurality of clamping formations projecting from the inner surface of the base region in spaced relation said one of the side walls, the clamping formations configured to engage a second side of the hinge arm opposite the first side such that in use, the hinge arm is clamped between the clamping formations and the locating ribs on said one side wall of the elongate channel shaped portion.

9. A vehicle having a body and a closure mounted to the body by a swan neck type hinge, the hinge having an elongate hinge arm attached to the closure at one end by a mounting structure, wherein the hinge cover member as claimed in claim 1 is mounted to the hinge arm.

10. The vehicle as claimed in claim 9, wherein a trim panel is mounted to the closure and an edge of the trim panel is attached to the housing portion by said formation.

11. The vehicle as claimed in claim 10, wherein said formation is a clip formation, an edge of the trim panel being clamped in the clip formation.

12. The vehicle as claimed in claim 10, wherein the trim panel has a live hinge proximal said edge.

13. The vehicle as claimed in claim 9, wherein the elongate channel shaped portion comprises a pair of spaced side walls interconnected at one end by a base region, the elongate channel shaped portion being resiliently deformable such that the side walls can be biased apart from a rest position, a plurality of locking projections being provided on the inner surface of the elongate channel shaped portion, the hinge arm defining corresponding locking formations in the form of locking apertures in which the locking projections engage to secure the cover member to the hinge arm.

14. The vehicle as claimed in claim 13, wherein the locking apertures are defined a side region of the hinge arm.

15. The vehicle as claimed in claim 9, wherein the hinge cover member comprises a plurality of locating ribs spaced apart along the inner surface of one of the side walls of the elongate channel shaped portion which engage a first side of the hinge arm, a plurality of clamping formations projecting from the inner surface of the base region in spaced relation said one of the side walls, the clamping formations engaging a second side of the hinge arm opposite the first side such that the hinge arm is clamped between the locating ribs on said one of the side walls of the elongate channel shaped portion of the cover member and the clamping formations.

16. The vehicle as claimed in claim 15, wherein the spacing between the side walls of the elongate channel shaped portion of the cover member is greater than the width of the hinge arm.

17. The vehicle as claimed in claim 9, wherein the closure is a boot lid.

18. A hinge cover member for use with a swan neck type hinge for attaching a closure to a vehicle body, the hinge having a mounting structure at one end of a hinge arm for attaching the hinge arm to the closure, the hinge cover member comprising an elongate channel shaped portion for receiving the hinge arm and a housing portion at one end of the elongate channel shaped portion configured to overlie part of a surface of the closure about the mounting structure and wherein the housing portion defines at least one formation for attaching an edge of a trim panel mounted to the closure to the housing portion,
   wherein the at least one formation is a clip formation for gripping said edge of the trim panel, the at least one clip formation defining a slot along at least part of an edge of the housing portion into which an edge region of the trim panel is inserted in use.

\* \* \* \* \*

UNITED STATES PATENT AND TRADEMARK OFFICE
CERTIFICATE OF CORRECTION

| | |
|---|---|
| PATENT NO. | : 11,433,828 B2 |
| APPLICATION NO. | : 16/963195 |
| DATED | : September 6, 2022 |
| INVENTOR(S) | : David Molyneux, Steve Crowe and Paul Wentworth |

It is certified that error appears in the above-identified patent and that said Letters Patent is hereby corrected as shown below:

On the Title Page

The date at the end of the line beginning (22) PCT Filed:
"January 19, 2019"
Should read:
"January 3, 2019".

Signed and Sealed this
Sixteenth Day of July, 2024

Katherine Kelly Vidal
*Director of the United States Patent and Trademark Office*